July 19, 1927.
H. J. SCHUETTE
1,636,248
VEHICLE BUMPER
Original Filed Feb. 10, 1925
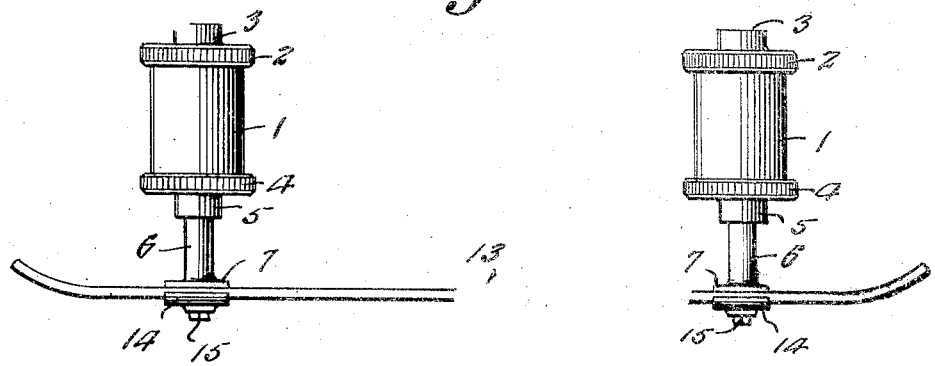
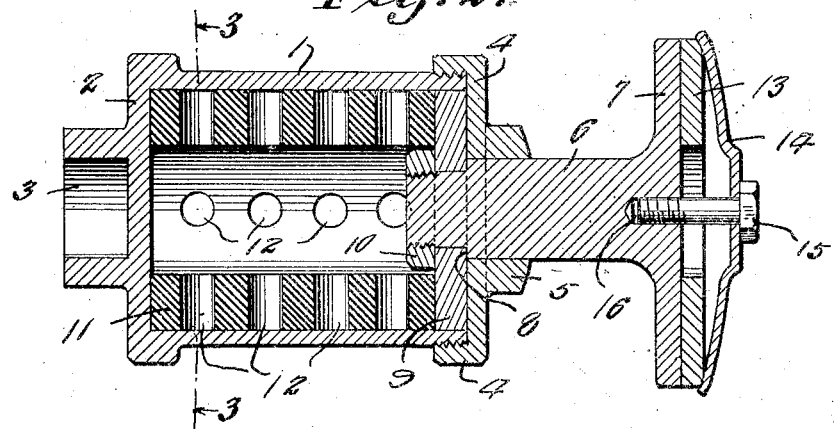
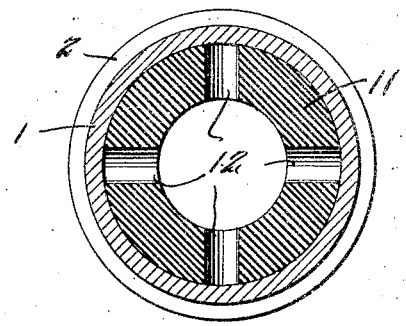
Inventor
H. J. Schuette
By Roland T. Whitaker
his Attorney Patented July 19, 1927.

1,636,248

UNITED STATES PATENT OFFICE.

HENRY JOHN SCHUETTE, OF QUINCY, ILLINOIS.

VEHICLE BUMPER.

Application filed February 10, 1925, Serial No. 8,247. Renewed May 2, 1927.

An object of the invention is to provide a bumper having a rubber cushion. Another object of the invention is the provision of a resilient piston means for absorbing shocks to either end of a motor vehicle.

Other objects and advantages of my mechanism will be apparent from a reading of the following description taken in connection with the accompanying sheet of drawings.

In the drawings, Figure 1 is a plan view of an assembled bumper construction.

Fig. 2 is a longitudinal cross sectional view, and

Fig. 3 is a sectional view taken on line 3—3 of Fig. 2.

The same parts are designated by the same characters of reference. Numeral 1 refers to a cylinder having end 2 and socket 3. The bumper may be obviously attached to motor vehicle frame horns in an approved manner and is, of course, equally adapted for use in front or rear of the chassis and the vehicle may be an automobile or truck.

The open end of cylinder 1 is covered by screw threaded cover or cap 4 having a boss 5. In boss 5 and cap 4 is a central bore in which a cylindrical plunger 6 may reciprocate. Plunger 6 has a plunger head 7 and a rear shoulder 8 abutting against piston 9, the parts being connected by nut 10.

In the cylinder 1 and between end 2 and piston 9 is a cylindrical centrally bored resilient rubber pad or cushion 11 having radial perforations 12.

To the front end of the mechanism are attached bumper bars 13. I have shown two in number but it is evident that a smaller or greater number of bars could be used. A plate 14 holds bars 13 and through plate 14 is a bolt 15 held in screw threaded hole 16 in plunger 6.

In operation, upon the bumper hitting an object the shock will be absorbed by the resilient rubber pad. The resiliency will then return the plunger to normal extended position. The parts are easy to assemble and on wear can readily be replaced. The assembly is inexpensive, durable and will resist shocks to a high degree.

It must be understood that only a preferred embodiment of my invention is herein shown and described and any departure from the same, such as in shape, size or arrangement of parts may be resorted to without departing from the spirit of the invention or from the spirit or scope of the subjoined claim.

Having thus described my invention what I claim and desire to secure by Letters Patent is:

A vehicle bumper comprising bumper bars attached to a plunger member, a cylinder, a piston in the cylinder actuated by said plunger member, and means in the cylinder abutting the piston for absorbing shocks to said bumper bars, plunger and piston, said means comprising a rubber pad having radial perforations and a central bore.

HENRY JOHN SCHUETTE.